March 29, 1955
J. B. BRENNAN
2,704,880
METHOD OF MAKING A CONDENSER
Filed Jan. 13, 1948
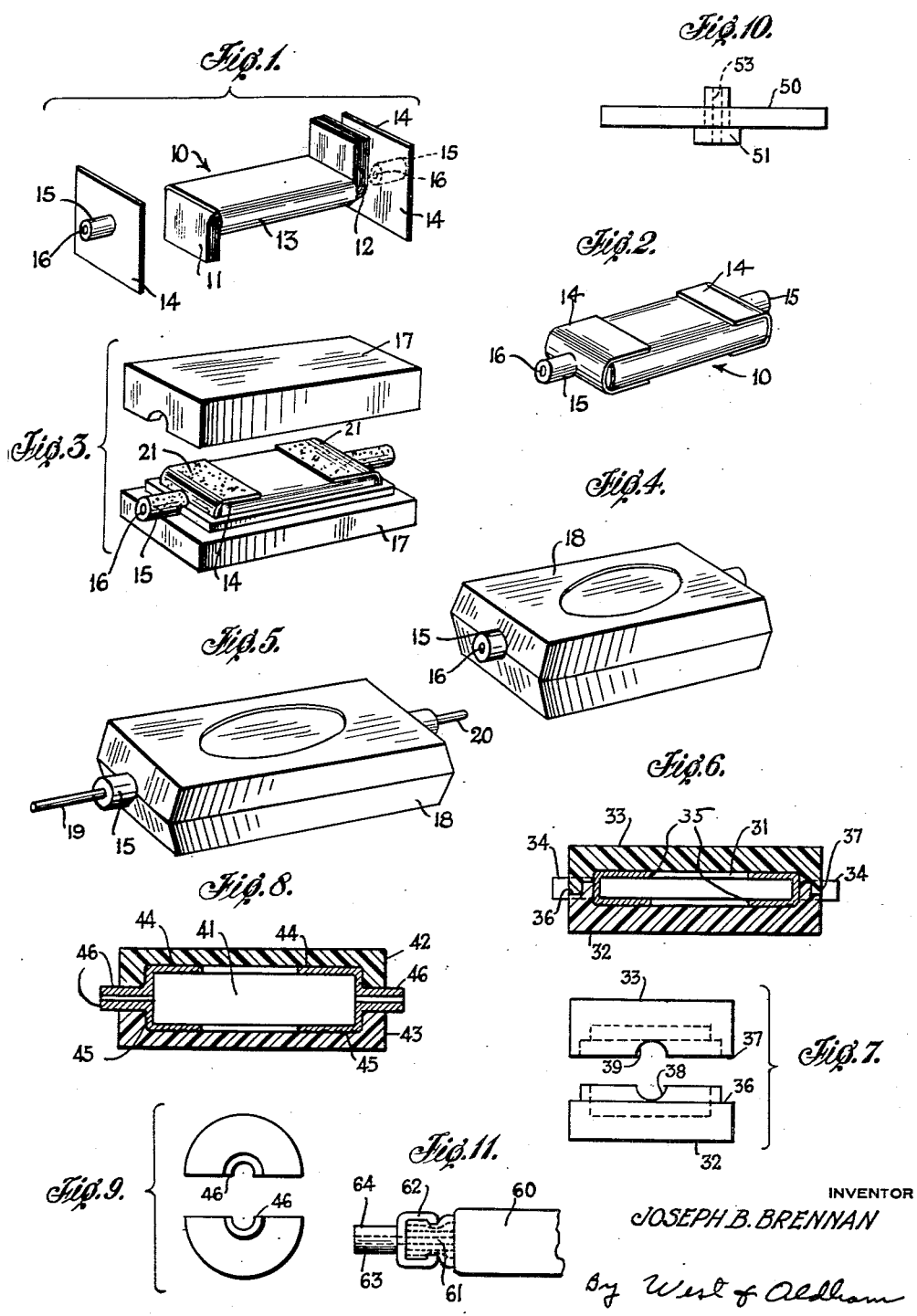
INVENTOR
JOSEPH B. BRENNAN
By West & Oldham
ATTORNEYS

United States Patent Office 2,704,880
Patented Mar. 29, 1955

2,704,880

METHOD OF MAKING A CONDENSER

Joseph B. Brennan, Bratenahl, Ohio

Application January 13, 1948, Serial No. 1,928

5 Claims. (Cl. 29—25.42)

This invention relates to condensers and methods of making same, especially to small condensers formed from interleaved metal foil and insulator strips which are embedded in an insulator body.

Heretofore, in the manufacture of small condensers of the class described, it has been customary to form the condenser body by associating two electrically separated sheets or sets of sheets of metal foil by interleaving insulating paper therebetween. Usually, the two sets of metal foil individually protrude from opposite ends of the insulator paper and metallic terminal plates are compressed into engagement with such exposed metal foil, which may be bent back upon one surface of said condenser body in forming a terminal therefor. After the condenser body has the terminal plates secured thereto, which plates usually have terminal leads extending therefrom, the condenser body has an uncured thermosetting insulator briquette associated with a pair of opposed surfaces thereof. Next the condenser assembly is inserted into a suitable mold wherein a high pressure, such as 18 tons per square inch, is set up, and the mold is permitted to remain therein for a short period to set the thermosetting insulator material. The mold is heated to a high temperature, usually about 285° F., when the pressure is applied thereto so that the insulating material is set rapidly in a desired shape to complete the condenser.

Due to the extremely high pressures and the high temperature exerted on the condenser body as it is being cured, some of the metal foil sheets of the condenser body may have their physical and/or electrical properties altered appreciably.

Still another disadvantage of the high curing temperature and pressure for condensers is that the condenser body usually is impregnated with an insulator material, such as oil or wax, prior to the molding of an insulating cover thereon. The electrical properties of the resultant condenser are further altered and rendered non-uniform, due to the formation of gas from the impregnating material when the condenser is being cured.

It is the general object of the present invention to avoid and overcome the foregoing difficulties with and disadvantages of previous condensers of the class described and methods of manufacturing same.

A further object of the invention is to provide a method of manufacturing condensers wherein the condenser body can be encased in a molded insulator cover prior to the impregnation of the condenser body.

Another object of the invention is to provide a condenser of the class described which has uniform characteristics and which is adapted to withstand higher voltages than previous types of condensers produced in accordance with the teachings of the prior art.

A further object of the invention is to seal a precured sectional insulator body around a condenser body at substantially room temperature and under low pressure.

A further object of the invention is to seal a condenser in a molded cover encasing same.

The foregoing and other objects and advantages of the invention will be made apparent as the specification proceeds.

Attention now is directed to the accompanying drawings wherein:

Fig. 1 is an exploded perspective view of a condenser shown in the process of being manufactured in accordance with the principles of this invention;

Figs. 2, 3, 4 and 5 are also perspective views showing the remainder of the operations producing a condenser in accordance with the invention disclosed herein;

Fig. 6 is a longitudinal section of a condenser, shown partly in elevation, in the process of manufacture and embodying a modification of the invention;

Fig. 7 is an exploded end elevation of the pre-formed cover sections, shown in Fig. 6;

Figs. 8 and 9 are a longitudinal section, and an exploded end elevation, respectively, of a further modification of the invention;

Fig. 10 is an end elevation of a different type of terminal plate and eyelet means that may be used; and Fig. 11 is a fragmentary side elevation of a further modification of the invention.

Reference now is made to the details of the structure shown in the accompanying drawings and a condenser body 10 is shown which is formed in accordance with conventional practice. The condenser body 10 is formed from two strips of metal foil, or metal impregnated material, 11 and 12 which are positioned in overlapping relationship with an insulator sheet, such as impregnated paper, 13, positioned therebetween and over at least one outer surface thereof. These metal foil and paper strips are usually folded or rolled up on each other to form the condenser body 10, which has edge portions of the metal foil 11 and 12 extending therefrom and adapted to serve as terminal means for the condenser body. One salient feature of the present invention which serves to differentiate a condenser made in accordance with the invention from other types of condensers of the same general type is that the condenser body 10 is dry when originally formed and is provided with an insulator cover when dry, whereas in accordance with previous practice, the condenser body would normally be impregnated with oil or wax, depending upon the specific use for which the condenser was designed, prior to molding a cover thereover.

In order to permit the dry assembly of the condenser body and subsequent impregnation of same, substantially rectangular terminal plates 14, having substantially tubular bosses 15, are provided for engagement with the exposed portions of the metal foil strips 11 and 12 provided at opposite ends of the condenser body. The tubular bosses 15 are provided with bores 16 therein which extend through the plates 14, as indicated in Fig. 1. The terminal plates 14 are made of soft material, such as copper, so as to permit their ready engagement with or crimping over the ends of the condenser body by relatively low pressure. A low pressure, such as 15 lbs. per square inch, does an effective job of squeezing the terminal plates into engagement with the exposed terminal portions of the metal strips 11 and 12 with the tubular bosses 15 extending outwardly of the condenser body from opposed end portions thereof.

In one embodiment of the method of the invention, briquettes 17 of thermo-setting plastic material, such as phenyl formaldehyde resins, are associated with opposed faces of the condenser 10. The briquettes 17 are of substantially flat U-shape (in section), as indicated in Fig. 3. Next, the condenser body 10 with one of the plastic briquettes 17 on opposed faces thereof is positioned in a suitable curing device or mold and pressure is exerted on the condenser assembly so as to shape the plastic briquettes to a desired form and to provide an insulating enclosure for the condenser body. The insulating enclosure, indicated by the reference numeral 18, is formed around the condenser body 10 and the only connection to the condenser body 10 is through the bores 16 of the terminal plates. Any desired impregnating material for the condenser body may then be forced into same through the bores 16 by connecting pressure feed means to the bosses 15. If necessary, a hole (not shown) may be cut into the end sections of the strips 11 and 12 before the terminal plates 14 are engaged therewith, which holes would ultimately be in substantial alignment with the bores 16 to permit ready flow of an impregnating material into and between the adjacent convolutions of metal foil and insulator strips.

After the condenser body has been suitably impregnated with an insulating material, the terminal wires 19 and 20 for the condenser are secured to the bores of the terminal plates 14 by any conventional method, such as by soldering them in position. Hence, the condenser body is now completely sealed within the insulator body 18 and the impregnating material completely and uniformly separates the strips of metal foil 11 and 12 used in forming the condenser plate.

As a further feature of the invention, the outer surfaces of the terminal plates 14 and the condenser body 10 are completely coated as at 21 with a suitable oil resistant cement such as one made from a synthetic rubber, or rubber-like material, such as neoprene or Fairprene, which cements aid in sealing the condenser in its insulator cover.

Figs. 6 and 7 show a modification of the invention wherein the condenser body proper is not subject to high pressures during the sealing of a cover therearound. To this end, a conventional condenser body 31 is provided and it has two pre-cured plastic insulator cover sections 32 and 33 which are adapted to be joined together to enclose the condenser body 31 completely, except for tubular terminal sections 34 provided on two terminal plates 35 that are in crimped engagement with opposed end portions of the condenser body 31. In the specific pre-cured insulator sections shown, the section 32 is provided with a recessed portion 36 extending around the periphery thereof whereas an outwardly extending flange or shoulder 37 is formed on corresponding portions of the insulator section 33 so as to form a locked engagement with the insulator section 32. Recesses 38 and 39 are provided in the insulator sections 32 and 33 so as to receive the tubular sections 34 of the terminals therein without compressing the same. By use of a conventional thermo-setting resin cement, such as Cycleweld, made by the Chrysler Corporation, the insulator sections 32 and 33 can be permanently united in a simple manner. This type of a resin bonding cement will set at substantially room temperature and produce an airtight enclosure for the condenser of the invention. Again, after the condenser sections are assembled, the condenser can be impregnated with an insulating material through the terminal portions 34 after which these tubular portions may be sealed in any desired manner. The low temperature used for setting the Cycleweld cement also will assist in setting any synthetic rubber cement that is placed on the outer portion of the condenser body and terminal sections to seal the connection between them and the insulator cover, as explained hereinbefore.

Still another modification of the invention is shown in Figs. 8 and 9 and may comprise a condenser body 41, which is in the form of a cylinder and which may be positioned in insulator sections 42 and 43, that may be formed from precured briquettes, as desired. In this instance, separate terminal plates 44 and 45 are engaged with each end of the condenser body 41 and they are adapted to extend therefrom axially outwardly thereof. Axially outwardly extending neck portions 46 are provided on each of the terminal plates 44 and 45 and cooperate to provide a substantially tubular member after the insulator sections 42 and 43 are cured or cemented together whereby impregnating material may be forced into the condenser.

By forming a condenser in accordance with this invention, the metal foil used in forming the condenser is not subjected to excessive physical strains and the capacity of the resultant condenser is uniform throughout its area, and is uniform with the capacity of other condensers produced in accordance with the same teachings. Formation of gas pockets from the impregnating material during molding operations is avoided and the condensers obtained have desirable operating properties and are adapted to be used under higher voltages than condensers having less uniform characteristics and compositions.

Fig. 10 shows a modified type of a terminal plate which may be used in forming the condensers of the invention. In this instance, the terminal plate 50 is provided with an aperture therein through which an eyelet 51 extends. This eyelet 51 has a bore 53 formed therein and extending completely therethrough. Usually the eyelet 51 is formed by flaring out the end of a piece of tubing so that a simple, uncomplicated type of apertured terminal plate assembly can be provided. It will be realized, of course, that, in some instances, it may be desirable to provide a special terminal plate with an apertured boss or other member thereon at only one end of a condenser and the terminal plate at the other end of the condenser may be formed in accordance with previous practice, since impregnating material can be forced into a condenser from only one end thereof without sacrifice of the benefits of the invention.

Fig. 11 shows a further modification of the invention wherein a condenser body constructed as in the other types of condensers referred to hereinabove is provided and it has a plurality of folds of a strip of metal foil 61 or the like, extending axially from one end thereof. A terminal plate 62 is crimped into engagement with the protruding portions of the metal strip 61 and an aperture 63 in the boss 64 on the terminal plate permits flow of a fluid impregnating material through the boss 64 and terminal plate 62 into and between the associated laminations of the metal strip 61.

The terminal plates used in the practice of the invention, usually formed from copper, normally will be tin plated to render them chemically inert.

In the manufacture of condensers, it is very important to prevent the insulating papers used from having any water content because such water in the insulating papers will cause the production of irregularities and even failures in the condensers during molding. Even small amounts of moisture are very detrimental and produce, at least, irregularities in the condensers. By the practice of the present invention, the interior of the condenser body is open during the molding process so that any moisture, even to a sweat film on a condenser body, will be driven out of the body during the molding thereof and before it is sealed.

It will be seen that the method of condenser manufacture disclosed is applicable to the formation of any desired type of condenser, both dielectric and electrolytic and that the feature of drying a condenser completely, or of enclosing a condenser in its permanent cover, before sealing or otherwise completing same is very advantageous. By practice of the invention, an improved condenser with uniform operating characteristics is achieved so that the objects of the invention are realized. The neoprene cement will usually have vulcanizing ingredients and a solvent therein, as well as any other desired components. The cement will set to form a resilient insulating material which will seal the condenser in its cover over a wide range of operating temperatures.

While several embodiments of the invention have been disclosed herein, it will be appreciated that modification of these particular embodiments of the invention may be resorted to without departing from the scope of the invention as defined by the appended claims.

Having thus described my invention, what I claim is:

1. That method of forming a small condenser from a plurality of layers of metallic material with strips of an insulating material therebetween comprising the steps of forming a condenser body with two terminal means associated therewith, molding insulator cover sections adapted to enclose the condenser body, placing an oil-resistant rubber-like cement over the entire periphery of the condenser body, associating the condenser cover insulator sections with each other with a condenser body enclosed therewith, one of the terminal means having an aperture therein connecting the condenser body to the atmosphere, setting the cement and sealing the condenser sections at a temperature below the flow point of the insulator sections so as to seal the condenser body in the condenser cover sections, said condenser body being thereafter impregnated with oil which is retained therein by said cement, and sealing the aperture in the terminal means.

2. That method of forming a small condenser from a plurality of convolutions of two strips of metallic material with an insulating material therebetween comprising the steps of forming a condenser body, molding insulator cover sections adapted to enclose the condenser body, placing an oil-resistant cement over the entire periphery of the condenser body, placing a synthetic resin cement over the portions of the cover sections which abut when the sections are associated, associating the condenser cover insulator sections with each other with the condenser body enclosed thereby, and setting the cements so as to seal the condenser body in the condenser cover sections at a temperature below the flow point of the cover sections.

3. That method of forming a condenser from a plurality of layers of metallic material with an insulating material therebetween comprising the steps of forming a condenser body, molding insulator cover sections adapted to enclose the condenser body, placing a synthetic resin cement over the portions of the cover sections which abut when the sections are associated, associating the condenser cover insulator sections with each other with the condenser body enclosed thereby, and setting the cement at substantially room temperature to seal the condenser body in the condenser cover sections.

4. Method of forming a condenser body from convolutions of metallic strips having insulating strips therebetween, securing terminals to edge portions of the metal strips, at least one of which terminals has a substantially tubular opening extending therethrough, the steps of coating the to be encased surface of condenser body and terminals with a plastic, oil resistant cement, sealing premolded and pre-cured insulator sections around the so coated condenser body and terminal portions at a pressure and temperature which does not change the dimension of the condenser elements, without closing the outer end of the tubular opening, in inter-mating relation, forcing a fluid insulating material into the condenser body through the tubular opening and sealing the tubular opening thereafter.

5. A process for producing an enclosed electrical condenser which comprises heat and pressure molding a multiple piece thermo setting resin encasement therefor of mating parts, assembling an interleaved condenser section with terminals attached at least one of which terminals comprises a hollow tube, applying a layer of dielectric bonding cement to the self mating and terminal mating portions of the encasement, placing the interleaved condenser section with the terminals attached inside the encasement and with said terminals extending from and through the layer of dielectric bonding cement, curing the applied cement and thereafter impregnating the condenser section through the tubular terminal and thereafter sealing the opening in said tubular terminal.

References Cited in the file of this patent

UNITED STATES PATENTS

| | | |
|---|---|---|
| 1,354,146 | Thomas | Sept. 28, 1920 |
| 1,497,415 | Thomas | June 10, 1924 |
| 1,497,449 | Kempton | June 10, 1924 |
| 1,745,400 | Brennecke | Feb. 4, 1930 |
| 1,873,548 | Cole | Aug. 23, 1932 |
| 2,181,695 | Given | Nov. 28, 1939 |
| 2,526,688 | Robinson et al. | Oct. 24, 1950 |